United States Patent [19]

Thomas

[11] Patent Number: 4,986,021

[45] Date of Patent: Jan. 22, 1991

[54] FISH NET AND METHOD OF CAPTURING FISH

[76] Inventor: Kent R. Thomas, 14228 Erwin St., #1, Van Nuys, Calif. 91401

[21] Appl. No.: 289,693

[22] Filed: Dec. 27, 1988

[51] Int. Cl.⁵ ............................................. A01K 73/12
[52] U.S. Cl. .......................................... 43/14; 43/104; 294/77
[58] Field of Search ................... 43/7, 8, 11, 14, 100, 43/101, 102, 103, 104, 105; 294/68.21, 68.22, 77

[56] References Cited

U.S. PATENT DOCUMENTS

| | | | |
|---|---|---|---|
| 796,709 | 8/1905 | Cornet | 43/8 |
| 2,252,949 | 8/1941 | Schell | 43/7 |
| 2,723,481 | 3/1954 | Schwartz | 43/102 |
| 2,784,514 | 3/1957 | Casson | 43/7 |
| 3,124,890 | 3/1964 | Puretic | 43/8 |
| 3,213,560 | 10/1965 | Phillips | 294/7 |
| 3,765,711 | 10/1973 | Hammond | 294/77 |
| 4,447,083 | 5/1984 | Campana et al. | 294/77 |

FOREIGN PATENT DOCUMENTS

| | | | |
|---|---|---|---|
| 907851 | 8/1972 | Canada | 43/14 |
| 27348 | 10/1916 | Norway | 43/14 |

OTHER PUBLICATIONS

Johnny Morris Bass Pro Shops 1989 Catalog, p. 265, "Deluxe Collapsible Fish Baskets".

Primary Examiner—Richard K. Seidel
Assistant Examiner—James Miner
Attorney, Agent, or Firm—Frank L. Zugelter

[57] ABSTRACT

A non-collapsible fish net apparatus (31) with capturing method, comprising an endless net (33) mounted on spaced rigid hoops (37, 38) preventing collapse, a skirt (39) below the lower hoop (38) foldable on itself, apparatus support lines (45) mounted to the upper hoop (37), control lines (51) folding and unfolding the skirt (39), a draw line (62) about the skirt (39), a closure weight (57) attached to the draw line (62), and a line (58) for dropping the weight (57) farther down to close off the skirt (39). Buoys (55) on the control lines (51) provide a signal for actuating the weight (57). Corks (44) on the upper hoop (37) float apparatus (31). A wave netting (70) at the upper hoop (37) prevents fish escape in a wave cascade over apparatus (31). A quick-disconnect assembly (65) on the draw line (62) distal to the closure weight (57) opens the skirt (39) in event of apparatus overload. Apparatus (31) encompasses fish in water after which the draw line (62) is tightened by release of the weight (57), thus, capturing them.

42 Claims, 5 Drawing Sheets

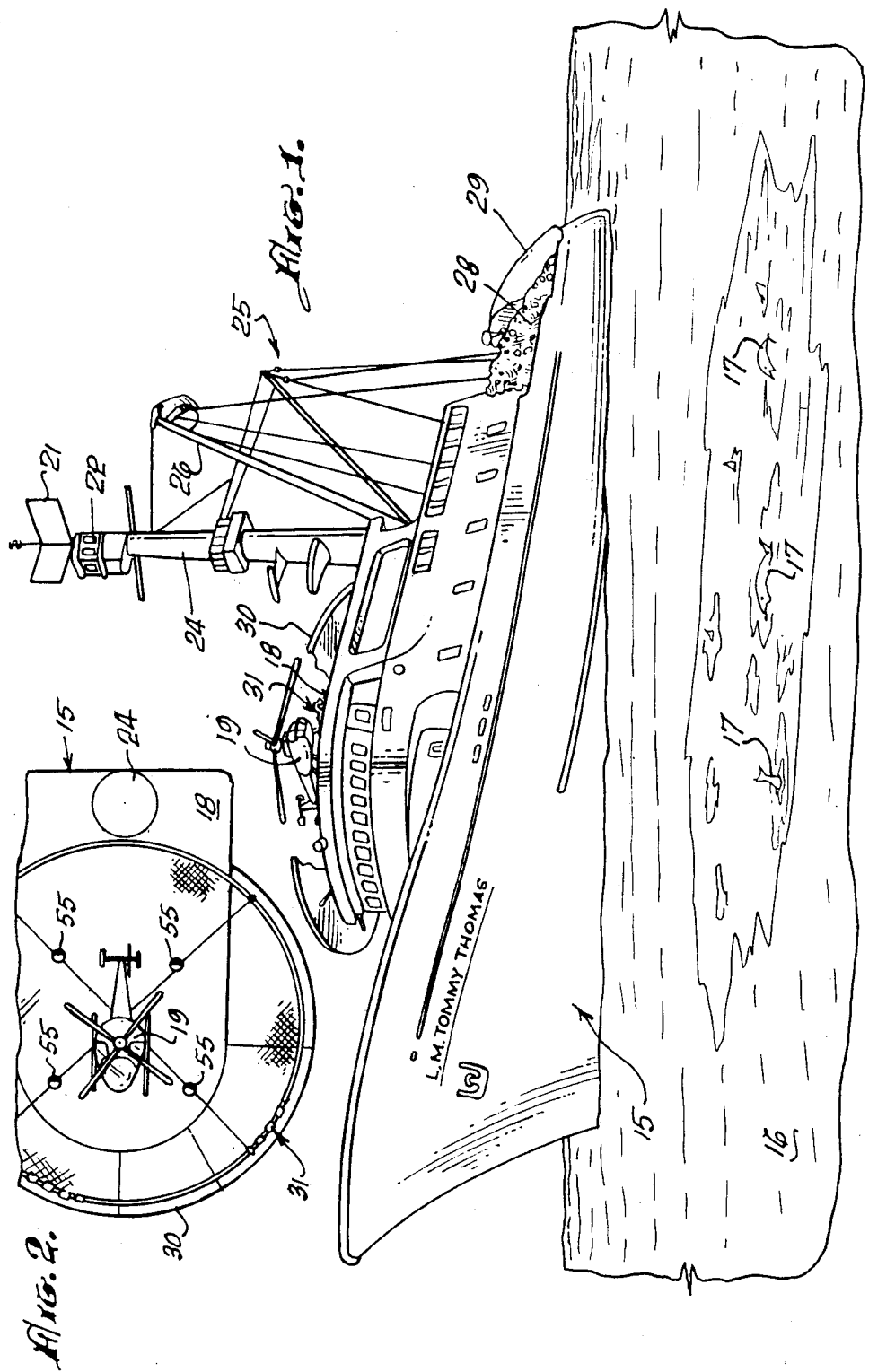

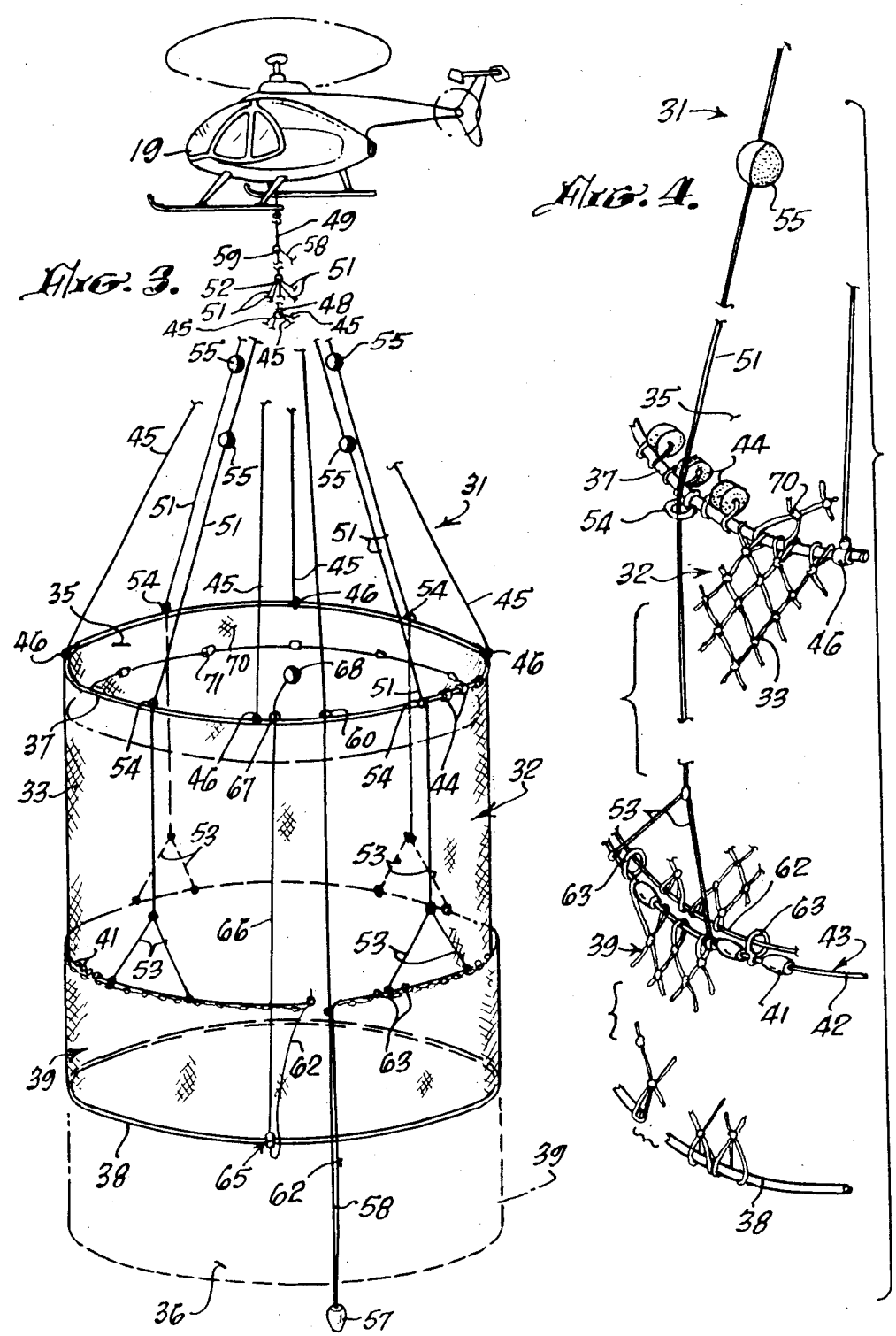

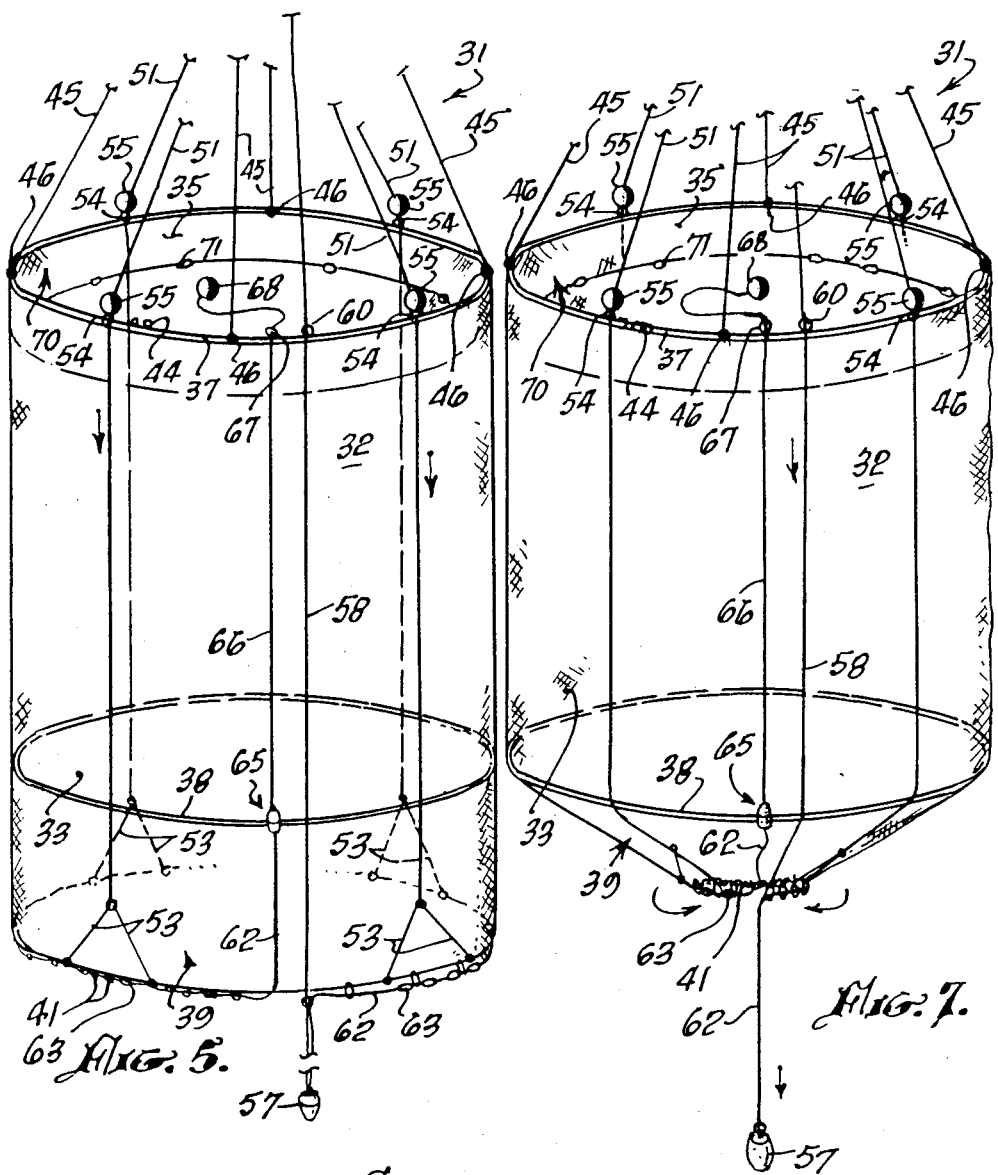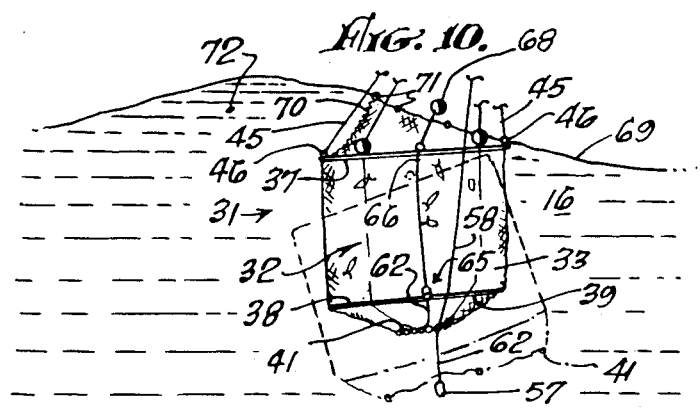

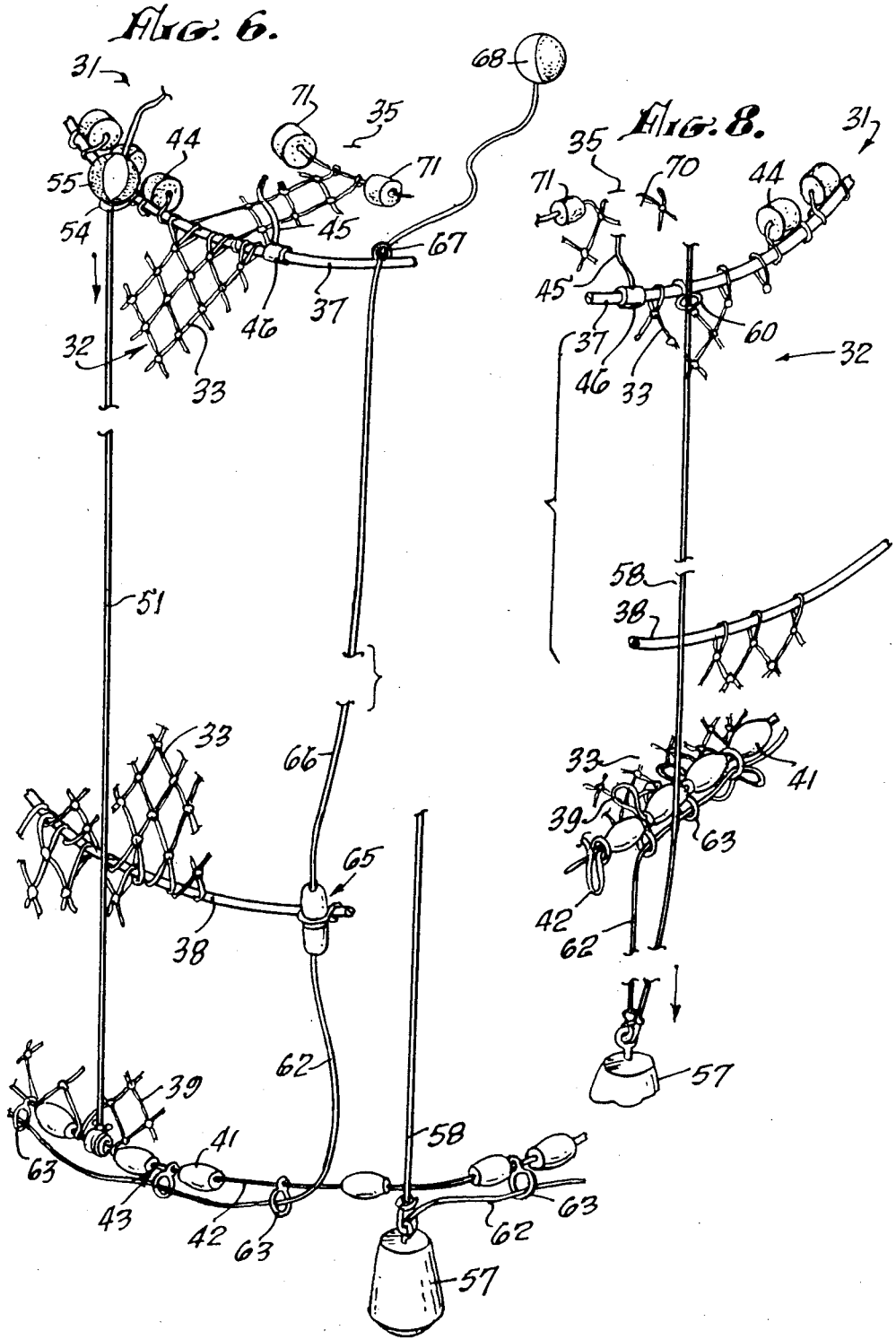

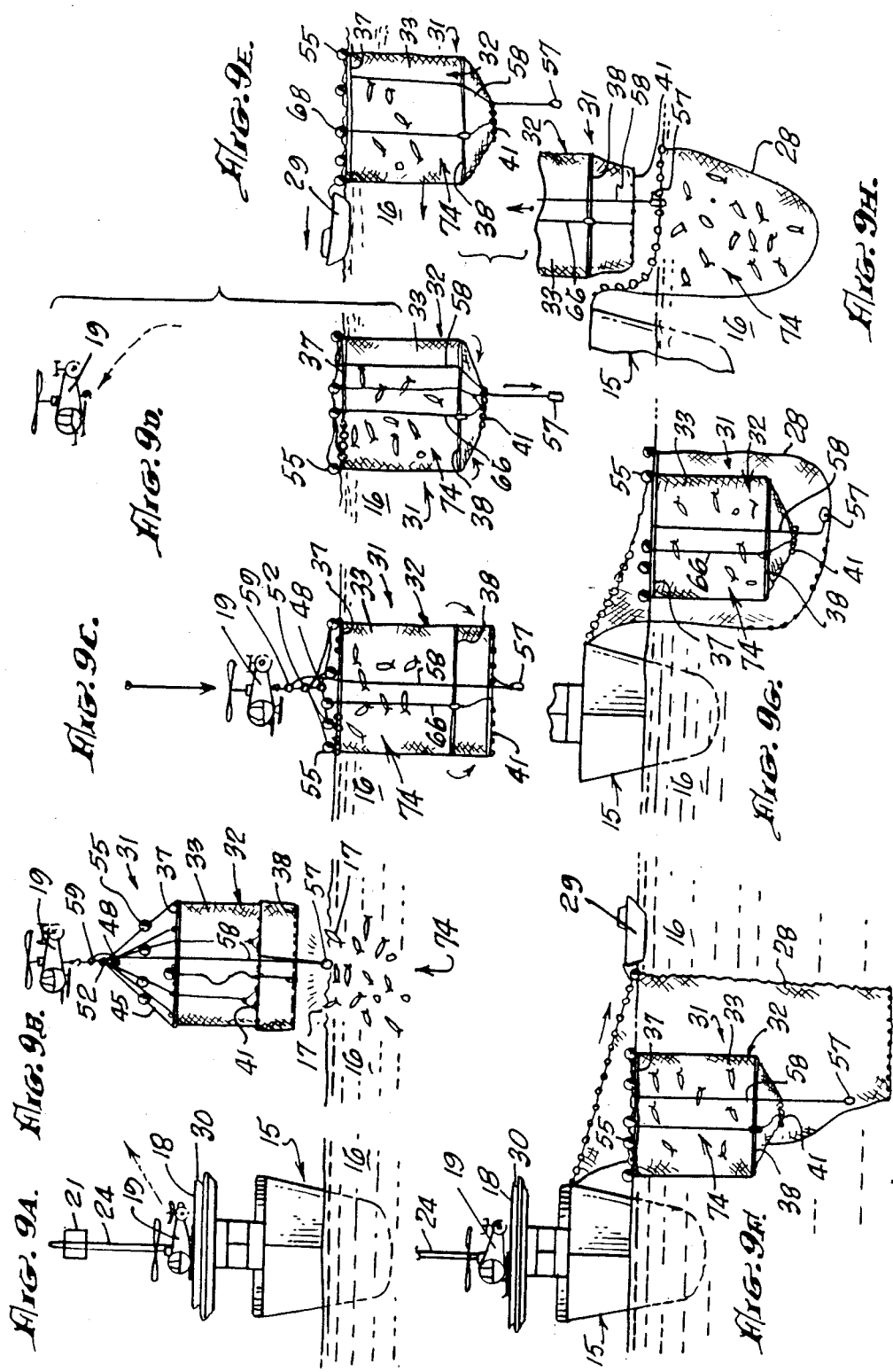

FISH NET AND METHOD OF CAPTURING FISH

TECHNICAL FIELD

This invention is directed to fishing nets, and particularly to a net apparatus and method for capturing a fish or school of fish in the waters of the world.

BACKGROUND OF THE INVENTION

1. Field of The Invention

This invention is directed to the capturing of a fish or a school of fish primarily to be found in deep waters such as those patrolled by boats in the commercial fishing industries of the countries of the world.

2. Description of The Prior Art

In prior-art conventional fishing apparata and methods used by commercial fishing boat personnel, to capture a school of fish in deep waters of the ocean, a purse net or seine has been utilized. The ordinary form of this purse seine is generally composed of an upper section of netting having a rope or line extending along its top side or edge and provided with spaced corks, this rope being commonly known as the "cork line", and a lower section of netting or seine which is adapted to be pursed by a pursing line along its bottom side or edge. This lower portion of the seine is also formed of a continuous section or piece of netting, and is known as the pursing apron. In operating this ordinary form of net, the lower portion or pursing apron of the seine sinks down in a vertical manner into the depth of the water, as its motherboat lowers the seine into the water while circling about a school of fish. The seine is continously dropped through the water by its motherboat, around the located school of fish in anticipation of capturing them, until the boat again establishes proximate contact with a skiff that has stayed put at the end of the seine where the motherboat began to first lower it inot the water. Upon such contact, a net functioning as a "sack" already mounted at such end of the netting is utilized to gather together the captured school of fish, from which sack the fish are removed and transferred into a hold of the motherboat. This activity involves much expenditure of considerable labor and time-consuming manuevers about and with the school of fish which in some cases escapes prior to sacking at the expense of such time, labor and attendant costs related thereto.

In addition to the above described conventional and well-known pursing seine arrangement, other art devices, in one way or another catching fish, are disclosed in U.S. Letters Pat. Nos.: 1,152,038; 1,152,081; 1,762,881; 2,570,285; 2,891,342; 3,604,139; 4,142,754; and Re. 30,877 (4,194,709).

SUMMARY OF THE INVENTION

The invention is embodied in a non-collapsible apparatus having means for its operation mounted completely exteriorly of a net assembly comprising an endless generally cylindrically-fashioned net formed of netting, having top and bottom openings formed by corresponding endless side edges. A hoop is mounted or attached at the one end or side edge at the net's top, with floatable corks spacedly disposed around such edge and hoop. A second hoop is mounted or attached around the net, generally in similar or parallel fashion to that at the top opening, but not at its other end or bottom opening. Rather, it is attached a distance therefrom so that a skirt is formed below the second hoop. The skirt is sufficiently long to be foldable upon itself, reversible back upon itself, exteriorly of its netting proper, to terminate at the lower hoop. Weights are affixed along and around the edge of the skirt (which, of course, terminates at the lower side edge of the endless net). Skirt control lines affixed to such skirt's edge extend upwardly to and beyond the top or first hoop, to a point of control on a cable from which the apparatus hangs in the invention's operation. An endless wave net with floatable corks is mounted to the edge at its top opening, hanging inwardly of the net in a downward or loose manner, for use in the event a wave or swell cascades over the apparatus while in the water, to prevent loss of fish through its top. A plurality of support lines are spacedly attached to the upper hoop, and are drawn together to a point on the cable, to support and control the motion of the apparatus. A separate line controls actuation of a closure weight mounted at its lower end and which in its operation tightens a pursing draw line to effect a closed bottom for the net assembly and through which the school of fish which has been captured cannot escape. The other end of the weight line is affixed to the cable which is ultimately connected to suitable means in a helicopter from which the entire apparatus by its support lines to the cable is hanging. As the helicopter hovers above a located school of fish, it or its cable slowly descends with the bottom of the apparatus in open mode, the apparatus being lowered into the water's depth about the school of fish. The support lines become slack as the corks float the apparatus at the water's surface. Then the skirt control lines become slack, as it or the cable continues descent, thereby unfolding the skirt by reason of the weights mounted around its edge sinking further into the depth of water. Buoys on the skirt control lines signal to helicopter personnel that the skirt is unfolded, and at which signal the closure weight's control line is released, such as by lowering the cable further if not by an alternative means. The weight sinks thereby tighting the pursing draw line together to close the skirt or bottom of the apparatus and thereby capture the school of fish. In the event of a fish overload within the apparatus, a quick disconnect assembly attached to the lower hoop and to the other end of the pursing draw line disconnects to open the bottom from its closed mode.

The invention also extends to a unique process by which a school of fish is captured. Upon sighting of a fish, or of a school of fish, which are, say, eating near the surface of the water, the apparatus of the invention is placed in a hovering position over the fish or school of fish. The apparatus in its open mode is lowered into the water's depth about the feeding fish. The corks float the apparatus as its support lines then become slack, and the skirt control lines then become slack as shown by their floating buoys. Release of the closure weight is effected to thereby close or tighten the skirt upon itself at the bottom of the apparatus and below the fish or school of fish, preventing them from escaping therethrough. The filled apparatus then is juxtapositioned to a mothership, such as by towing by a speed boat or skiff, and at which mothership a purse net having a "sack" to surround the captured fish within the apparatus is mounted. After the sack of the purse net has surrounded the apparatus, the helicopter removes the apparatus from the water's depth, the fish remaining within the sack for further processing by boat personnel to the mothership's hold. The helicopter returns to its helideck for "recocking" of the apparatus by personnel, so that it may again proceed aerially to seek out other schools of fish.

An object of this invention is to provide a novel net apparatus and method for capturing a fish or a school of fish.

Another object of this invention is to create a live-fish industry, compatible to their and our environment.

A further object of the invention is to achieve an atmospheric environmentally-sound fish net.

Another object of this invention is to prevent injury or death to captured fish, done to them in heretofore prior art devices during the capturing process.

Still another object of the invention is to capture all fish in a fresh and live state or condition, thereby enhancing their commercial value as food stock.

A further object of this invention is to provide a completely safe and harmless capturing environment for live fish, one in which no fish are killed or injured in the capturing process.

Another object of this invention is to free captured non-killed or non-injured fish in the event an overload of fish within the apparatus occurs, so that they return to the water's depth in unharmed condition.

Another object of the invention is to eliminate much time and labor and costs attendant thereto which in the past have been critical factors, singly or together, in capturing fish, prior to transferring them to a hold on a boat for further processing, thereby reducing or eliminating material repair, labor, and material costs.

Another object of the invention is to eliminate the use of the traditional seine and its manner of use, thereby reducing material costs, and time, labor and costs in capturing fish.

Another object of the invention is to produce an environmentally safe context for capturing fish, i. e., one in which the fish itself of their waters are not contaminated by dead or injured fish.

These and other objects and advantages of the invention will become more apparent upon a full and complete reading of the following description, appended claims, and the accompanying drawing comprising five (5) sheets of seventeen (17) FIGURES.

BRIEF DESCRIPTION OF THE DRAWING

FIG. 1 is a perspective view of a fishing boat in fishing water and on which the subject matter of this invention is housed, stored or transported.

FIG. 2 is a fragmentary plan view of the boat illustrated in FIG. 1, showing a helicopter, its helideck, and a flat surface extension mounted thereto for supporting the apparatus of the instant invention when in and not in use.

FIG. 3 is a perspective view of the apparatus of the invention in its open mode preparatory to capturing a school of fish.

FIG. 4 is an enlarged fragmentary perspective view of portions of the apparatus illustrated in FIG. 3.

FIG. 5 is a perspective view of the apparatus immediately prior to its closing upon and capturing a school of fish.

FIG. 6 is an enlarged fragmentary view of the apparatus illustrated in FIG. 5, prior to actuation of the weight control line, the actuation of which effecting a closed mode for the apparatus.

FIG. 7 is a perspective view of the apparatus of the invention after the weight control line has been released so that descent of the weight deeper into the water's depth draws the skirt and bottom of the apparatus into the closed mode for the apparatus.

FIG. 8 is an enlarged fragmentary view of the condition of the apparatus illustrated in FIG. 7.

FIGS. 9A-9H are a series of schematic FIGURES representing sequentially operative steps of the invention on a school of fish being captured thereby.

FIG. 10 is a schematic view of the apparatus of the invention, as a wave or swell of water cascades over the apparatus, illustrating the retention of fish, and further illustrating the release of captured fish through the bottom of the apparatus in the event of an overload (weight) thereon.

DESCRIPTION OF THE PREFERRED EMBODIMENT (S)

Referring now to the drawing wherein reference characters correspond to like numerals hereinafter, reference character 15 illustrates a fishing boat, searching for a school of fish which is to be captured for further processing of themselves or of their meat for commercial purposes.

FIG. 1 also includes a showing of, say, "tuna breezers" 17, which from time to time are observed while patrolling throughout water 16 and being on the lookout for sought-to-be-captured fish. It should be understood that when "tuna" fish is mentioned herein, it is an example of any one or number of species of fish which may be or are sought for today's commercial fishing industry or other purposes, and the invention is not limited only to capturing tuna for its meat or other purposes, but extends to any fish species, either in a school or one by itself, or to a combination of species, to which the apparatus and method of the invention are applicable, for whatever purposes are intended.

A helideck 18 is mounted upon boat 15, in known location and manner, and on which a helicopter 19 sets and is tethered thereto (not shown) for safekeeping during non-aerial use thereof, such as when not visually searching for a fish or school of fish sought to be captured. Present day commercial fishing industries utilize such services of helicopters, along with radio communication between its personnel and personnel on boat 15, via an antenna 21 mounted above a crow's nest 22 situated atop a mast 24 mounted on boat 15. Through antenna 21, radio communcation concerning the whereabouts of such a school of fish is communicated between personnel on helicopter 19 as it flies around and the boat personnel, so that the boat's direction efficiently proceeds towards located fish being sought for capture. Boat 15 also includes a conventional power block-and-tackle assembly 25 along with its boom 26 for operating a conventional purse net 28, as well as for hoisting onto and lowering from its deck a skiff or speed boat 29, with which radio communication is conducted when necessary, all presently known and utilized in known manner and ways in today's commercial fishing industry.

If necessary, for purpose of utilizing the present invention, a flat surface extension 30 is suitably constructed in engineering fashion and mounted, either as fixed to or in some suitable collapsible manner, to helideck 18, in order to accomodate a size of the invention's apparatus 31, its net assembly 32, FIG. 3, and other to-be-described elements not constrainable to the size itself of helideck 18.

Referring now to FIG. 3, apparatus 31 comprises net assembly 32 which includes a netting 33 configured into generally a cylindrical or other endless shape forming at its ends or side edges a top opening 35 and a bottom opening 36 shown in phantom at the lower extremity of FIG. 3, an upper rigid hoop 37 attached to its side edge at top opening 35, and a lower rigid hoop 38 attached to and about netting 33 in a similar and generally parallel manner to that for hoop 37, but at some distance inwardly from its side edge at bottom opening 36. A skirt 39 is formed in such distance, between hoop 38 and the side edge at bottom opening 36, the skirt 39 being foldable back upon itself and outwardly of netting 33 itself, so that the side edge at the bottom opening 36 is in general planar alignment with lower hoop 38, apparatus 31 remaining in its open mode. A plurality of lead weights 41, FIGS. 3, 4, are fixedly attached, in spaced manner to each other, to a rope or line 42 to which netting 33 itself is affixed and which forms a terminal edge 43 for skirt 39. At the other edge of netting 33, i.e., at the top opening 35 at which hoop 37 is disposed, a plurality of corks 44, is securely mounted about and around hoop 37, for floating apparatus 31 at such hoop's level in water 16.

A plurality of support lines 45 are spaced from one another at their fixed connections 46 to upper hoop 37, and they connect hoop 37 to a fixed point 48, FIG. 3, on a cable 49 which in operation extends downwardly in known manner from helicopter 19. A plurality of skirt folding lines 51, spaced from one another, securely connect line 42 of skirt 39 to another fixed point 52 on cable 49 above point 48. A pair of dogleg lines 53 may be utilized to connect each skirt folding line 51 to line 42 of skirt 19. A small ring 54 is attached to upper hoop 37 for guiding or maintaining each skirt folding line 51 in its proper position in net assembly 32 as such folding line 51 extends upwardly past hoop 37 to its attachment to cable 49. A buoy 55 is securely mounted along the length of each of skirt folding lines 51 at a point between its corresponding ring 54 and fixed point 52 on cable 49; the floating of buoys 55, in operation, is a signal that skirt 39 is unfolded in the open mode for apparatus 31.

A closure weight 57, FIG. 3, for closing or tightening of skirt 39 upon itself, is attached at a lower end of and to an actuating line 58 which extends upwardly to a third point 59, above point 52, on cable 49, at which it is fixedly attached. The disposition of closure weight 57 in the open mode of apparatus 31, with skirt 39 up or folded, is preferably below the plane of lower hoop 38, FIG. 3, in order to prevent it from seeking a position possibly fouling-up actuation of apparatus 31 in its operation, because of uncontrollable forces in the water which could move such weight to-and-fro. A connection ring 60 is attached on upper hoop 37 for retaining closure weight line 58 to net assembly 32 and apparatus 31, while also assisting in a proper actuation of line 58.

The one end of a draw line 62, FIGS. 3, 4, for closing the bottom opening of apparatus 31 is attached to closure weight 57, and extends around terminal edge 43, FIG. 4 of skirt 39 by means of a series of small rings 63, securely and spacedly mounted to the netting line or rope 42 of netting 33. Draw line 62 extends around terminal edge 43 in such manner, returning to a proximal location to line 58 for closure weight 57, FIGS. 3, 5, and thereat is directed towards lower hoop 38 on which a quick-disconnect unit 65 is secured and to which the corresponding end of draw line 62 is attached. A quick-disconnect line 66 extends from unit 65, its length fashioned or generally determined by the distance between hoops 37, 38 and a reasonable amount of slack, say, about six (6) feet of additional line. Line 66 extends towards and passes through a guide ring 67, FIGS. 3, 5, 7, 8, securely mounted to hoop 37. A buoy 68 is mounted to the free end of such slack or disconnect line 66, and functions to trigger unit 65 in the event line 66 becomes taunt (or pulled). For example, in the event, FIG. 10, a fish overload occurs within net assembly 32, the apparatus will begin to sink, this effect not being desired. Line 66 or its slack approaches tauntness as apparatus 31 sinks. Buoy 68 remains on the water's surface 69 while the tauntness of line 66 prevents hoop 38 and unit 65 from further penetrating the depth of the water. This causes draw line 62 to disconnect from unit 65. Skirt 39 opens by reason of slack or no-load generated in draw line 62, the sinking of lead weights 41 attached along line 42 of edge 43, and/or weight of fish load, the lead weights 41 moving in an arc downwardly and outwardly of their tightened or close-quartered positions to each other, thus providing escape for the fish while stopping the sinking of the apparatus. The fish is not harmed by operation of this feature, and the apparatus again floats, by reason of corks 44.

A wave netting 70, FIGS. 5, 10, extends from or is mounted to upper hoop 37 as an extension to netting 33, and comprises an endless ribbon of netting adapted to freely float and extend itself within, about, or inside the areal dimensions of upper hoop 37, as illustrated in FIG. 10. A plurality of corks 71 is spacedly securely mounted along or around the free edge of such ribbon and along which a line or rope (not shown in detail) is sewn and to which such corks 71 are attached. Such line and netting are fashioned in a conventional manner. In the event a wave 72 cascades over apparatus 31, fish are prevented from escaping the apparatus through its top opening by reason of wave netting 70 no longer loosely hanging in the water but rather functioning as a closed top to netting 33 or as a "net atop a net", to restrict fish to the interior and fullest confines of netting 33.

Turning to FIGS. 9A-9H, the method for capturing a school of fish will now be described in relation to such illustrations. The following description also serves to describe operation of the invention. Boat 15 embarks from port, helideck 18 and extension 30, if necessary, supporting apparatus 31 and helicopter 19, with all necessary crew, equipment, supplies, etc., also aboard. Upon reaching ocean or other water area 16, FIG. 9A, at which searching for, as an example, a school of fish is to be initiated, helicopter 19 takes off from helideck 18, searching for fish 74. Once fish 74 are visually observed, it returns to the mothership to await the latter's proximal positioning to the found fish. Helicopter 19 then takes off, transporting with and below it through its connecting cable 48 and/or other suitable supporting means within the helicopter, apparatus 31 in its open mode, with skirt 39 up. Helicopter personnel eventually visually observe the found fish or school of fish 74 feeding at the surface of water 16, the fish's frenzied collection commonly referred to as "foaming" or "boiling". Such personnel bring apparatus 31 to a hovering status over fish 74. After being positioned over them, FIG. 9B, in a direct overhead hovering manner, free of physical support or operative connection from the motherboat, such personnel begin to operate apparatus 31. Cable 48 is extended from helicopter 19 in known fashion, or helicopter 19 descends itself, and thereby, slowly lowers in its open mode apparatus 31, i.e., its bottom open with skirt 39 raised or folded back on itself, about the fish 74. Net assembly 32 continues to be lowered into the depth of the water, maintaining its open mode by reason of the rigidity of hoops 37, 38, i.e., in a non-collapsed state or condition, the confines of netting 33 being in its fullest open measure. Support lines 45 first go slack as apparatus 31 lowers, corks 44 undertaking to float it. Apparatus 31 finally assumes a position in the water, FIG. 9C, at which corks 44 prevent apparatus 31 from further sinking. Cable 48 is continued to be lowered or extended while skirt control lines 51 lower skirt 39 to its unfolded position, FIG. 6, in the open mode of apparatus 31. Buoys 55 on skirt control lines 51 assume their positions, FIG. 6, on the water's surface, floating thereon. Such floating positions of buoys 55 indicate to helicopter personnel that skirt 39 has unfolded, weights 41 now being at their lowest point in the open mode for apparatus 31, FIG. 9C. Meanwhile, closure weight 57 is descending via the descent of its control or actuating line 58 not yet released, to arrive at its location, FIGS. 9C, 6. Fish 74 continue to eat upon their find as net assembly 32 envelopes them. Cable 49 continues to descend, either by being fed out of helicopter 19 or by helicopter 19 continuing to descend with fixed cable. Closure weight 57 now sinks to a depth of water, FIGS. 7, 9D, much greater than at which lead weights 41 are disposed. Such sinking draws line 62, threaded along edge 43, tightly to itself, thereby closing skirt 39 and the bottom of net assembly 32. The school of fish 74 is now completely enveloped and is captured, and cannot escape through the bottom of apparatus 31. Cable 48 may be completely discharged from helicopter 19, which returns to its helideck 18 in due procedural course. Radio communication with boat personnel has been in effect always, during this procedure, and now is used to provide directions for personnel on skiff or speed boat 29 to come to the filled floating apparatus 31, making a towing connection in a suitable manner thereto, FIG. 9E, such as to hoop 37, to tow it towards its mothership 15. This should not be a great distance, as boat 15 has been or is manuvering to a nearby standing presence, awaiting for the capture of the fish.

Mothership 15 and floating apparatus 31 are juxtapositioned to one another, FIG. 9F. Skiff 29 now begins to set purse net 28 with its sack, or the sack itself, in the water, about apparatus 31, in known and similar manner as is practiced with the conventional purse seine and/or sack first described above. Once the sack by itself or with purse net 28 has surrounded completely apparatus 31 and its school of fish, FIG. 9G, which is done in the same general way as in the conventional pursing of seine or net about a school of fish, helicopter 19 hovers over apparatus 31 and hooks onto such apparatus, such as by cable 49, with an assist from personnel in a boat 29. Removing of apparatus 31 takes place. As helicopter 19 and/or its cable 49 ascends, so does closure weight 57 by reason of its control line 58 being attached at 59 to the cable. The pull on draw line 62, which kept the skirt's terminal edge 42 closed, is released. Weights 41 begin to sink, moving arcuately and outwardly. And as cable 49 continues to ascend, the slack in the portions of skirt control lines 51 above buoys 55 is eliminated, and skirt 39 begins to fold up on itself. Bottom opening 36, thus, is continuing to enlarge upon itself, thus providing a channel of movement for fish 74 to be transferred from the interior of netting 33 to the sack/purse net 28, as apparatus 31 is being raised. Finally, the slack in support lines 45 is eliminated by the continuing ascension of cable 49, and thus, the entire apparatus 31 is raised out of the water, FIG. 9H. All fish are freely swimming about in sack/purse net 28, being retained therein. With all of the live fish 74 now confined to such sack, they are further conventionally processed to the hold of mothership 15. Helicopter 19 with apparatus 31 returns to its helideck 18, dropping such apparatus thereon or on extension 30, as the case may be. Helicopter 19 may remain in the air over or land on helideck 18, while apparatus 31 is reset or "re-cocked" by qualified personnel to its open-mode condition as illustrated in FIGS. 3, 5, 9B, so that helicopter 19 again may set off to search for other fish to capture.

It may be noted, FIG. 9G, that closure weight 57 is supported on the floor of net or sack 28. This may assist in releasing the pull on draw line 62, and weights 41 may sink, as stated above. However, this assist, i.e., closure weight 57 being on such floor, is not essential to the operation of the invention, in the event the sack's floor is at a depth deeper than the deepest point for weight 57.

In the assembly of apparatus 31, hoops 37, 38 are fastened, such as by sewing to netting 33. Rings 54 are welded or otherwise secured to hoop 37. Line 42 is threaded through and sewn to netting 33, while lead weights 41 are attached to line 42. Support, folding, and actuating lines 45, 51, 53 are correspondingly assembled upon or to hoop 37 and line 42. Closure weight 57 is attached to the one end of closure weight line 58 which is threaded through ring 60 on hoop 37. Draw line 62 is attached at its one end to closure weight 57, then threaded through to quick-disconnect unit 65 welded or otherwise suitably secured to lower hoop 38. Disconnect line 66 is likewise connected to unit 65. Buoys 55, 67 are affixed to their corresponding lines 51, 66 at their proper dispositions along the lengths of such lines. Lines 58, 51, 45, are affixed to cable 49.

The aforescribed elements all are of known nature and materials and are readily adaptable to the assembly of apparatus 31. Netting 33 and the various lines or ropes, rings, buoys and other elements attached, affixed or otherwise connected to it are threaded or sewn together, or in other known and suitable manner fastened together to one another, in order to support the weight of apparatus 31 and to anticipate forces/weight arising out of captured fish therein, and water and air motions. Cable 49 is of strong, flexible, known material. Disconnect unit 65 may be of any suitable kind, those used in the aerospace industry being an example.

Various changes and modifications may be made without extending to outside of or departing from the spirit and scope of the invention or its inventive concept. The closure weight line 58 may extend directly to a cargo hook (not shown) in helicopter 19 rather than being affixed to cable 49, and operated directly by helicopter personnel by means of releasing it from such hook upon the indicated signal of buoys 55. Dogleg lines 53 need not be used, as reflected by their absence in FIG. 6. When quick-disconnect unit 65 is not used, the draw line 62 at its distal end from closure weight 57 is terminated, say, at a corresponding guide ring 63, preferably located adjacent the disposition of closure weight control line 58. The length of skirt 39 preferably is such that as draw line 62 is tightened to close bottom opening 36, that its encircling netting does not become taut between lower hoop 38 and the bunched-up and tightened draw line 62. Rather, such netting is preferably loosely collected together as edge 43 reaches its fullest tightened circle. The interstices of netting 33 may vary depending upon the use of apparatus 31. In its use for capturing fish for commercial purposes, they should be sufficiently small or narrow so that gilling by the caught fish does not occur, to either harm them or damage the net. The apparatus is operable in a submersed location in water as well as in a floating condition. The apparatus is operable upon a boom 26-and-block-and-tackle 25 arrangement as well as that illustrated herein via cable 49 and helicopter 19, and it should be clear that the inventive concept of the method of capturing fish disclosed herein contemplates not only hovering independently of a boat 15 or other water vessel, but also hovering by such indicated arrangement which is operatively connected to a boat 15 or other water vessel. Also, the inventive concept contemplates the skirt not necessarily having to be folded or unfolded, but to operate in its extended position from lower hoop 38, with weighted or other suitable means to maintain it so, preparatory to its terminal edge closing. Furthermore, it should be apparent that the traditional seine net and its pursing apron may not be an essential requirement for use or operation of this invention, but rather a mere "sack" appears to be satisfactory for use with apparatus 31. In other words, in one sense, apparatus 31 replaces such a seine net and pursing apron.

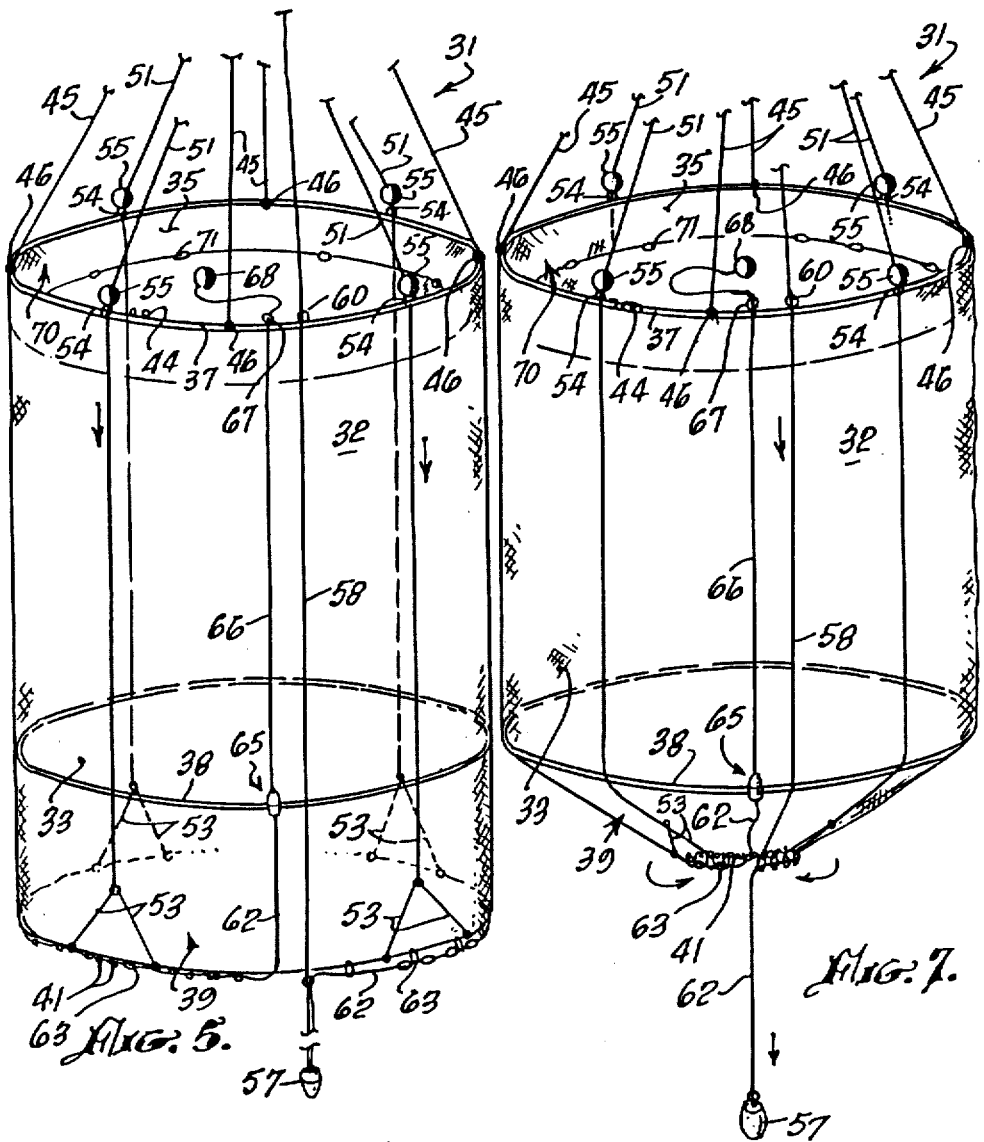
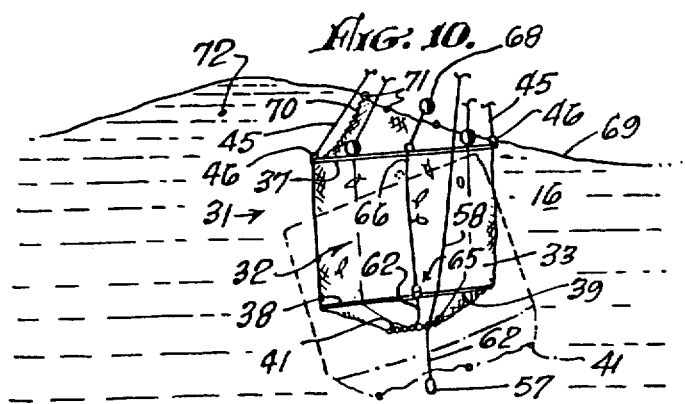

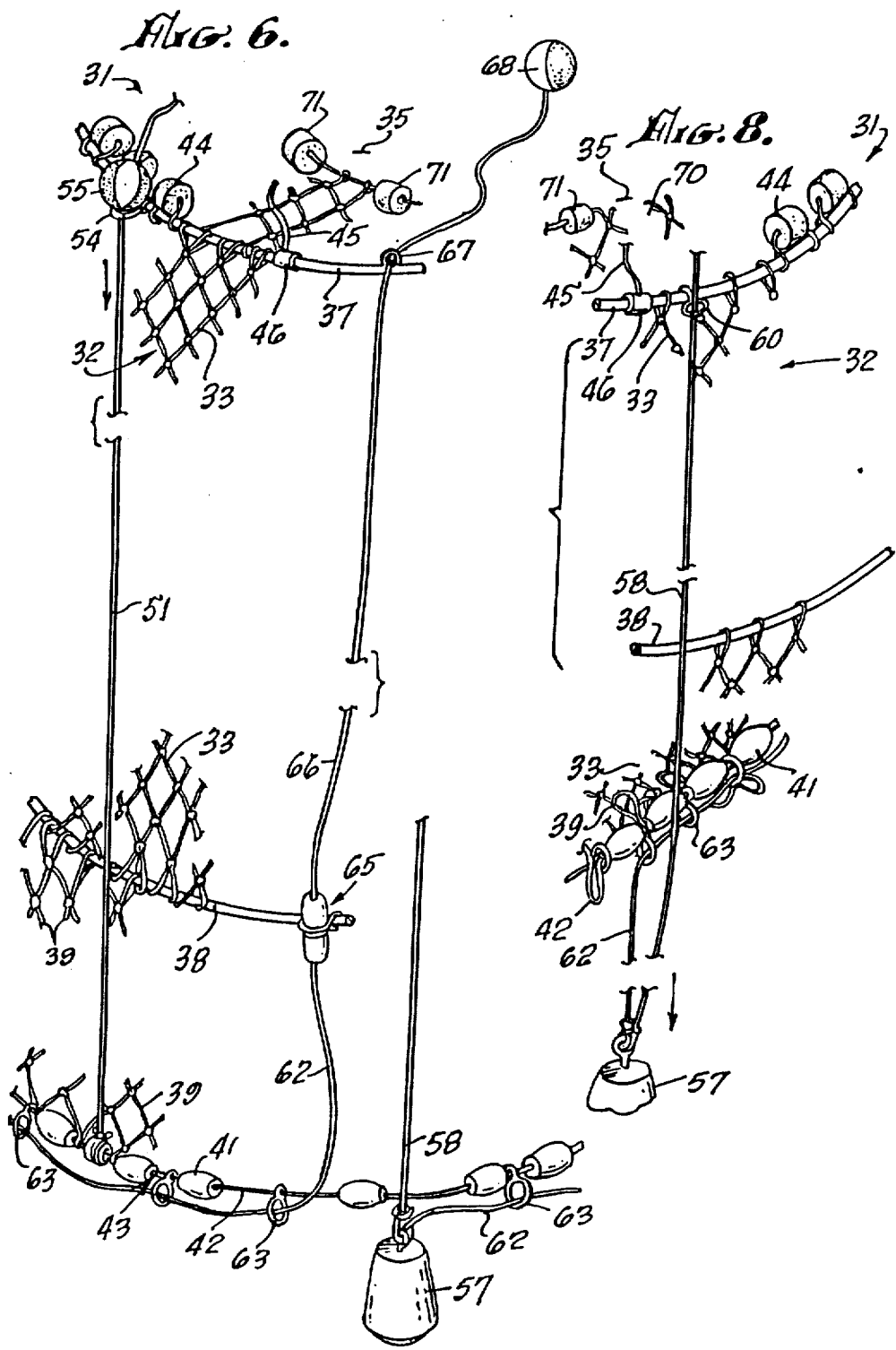

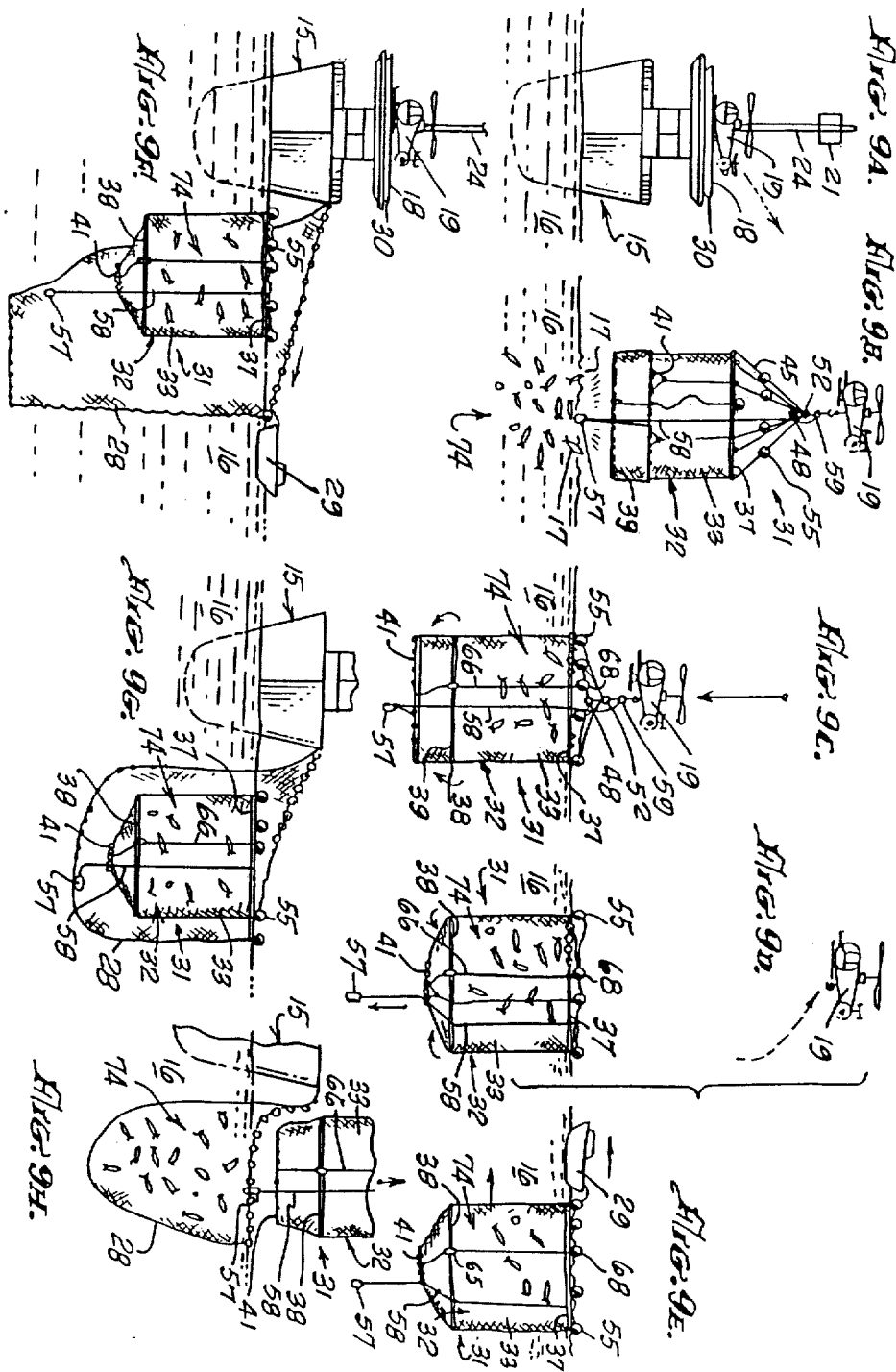

I claim:

1. A method of capturing one or more fish found in a depth of water comprising
   providing an apparatus with a net assembly having an upper end and a lower end and first and second rings mounted to said net so that they are in spaced relation to one another in operation of the apparatus and with skirt means mounted to the first of said rings, the lower end of said apparatus having a closable bottom,
   hovering over the fish with said apparatus, and enveloping the fish in the water through said bottom, whereby the enveloped fish do not escape through said bottom upon operation of the apparatus.

2. The method of claim 1 including the step of transporting the apparatus prior to the hovering step to the location of such fish.

3. The method of claim 2 wherein said transporting step comprises operatively connecting the apparatus by means of a cable to supporting means on a helicopter.

4. The method of claim 1 or claim 2 or claim 3 wherein said hovering takes place independently of operative connection to a water vessel.

5. The method of claim 4 wherein said enveloping step comprises lowering the net assembly with its bottom in open
   mode into the water's depth about such fish, and closing the open bottom of the net assembly.

6. The method of claim 3 including the step of floating the apparatus.

7. The method of claim 4 including the step of floating the apparatus.

8. The method of claim 5 including the step of floating the apparatus.

9. The method of claim 5 including the steps of
   juxtapositioning the apparatus after the closing step to a boat onto which such captured fish is to be stored,
   setting in the water sack means around the apparatus, opening the closed bottom of the net assembly, and transferring the captured fish into the sack means.

10. The method of claim 9 including the step of floating the apparatus.

11. The method of claim 10 wherein said transferring step comprises
    lifting the apparatus out of the water.

12. The method of claim 9 wherein said transferring step comprises
    lifting the apparatus out of the water.

13. The method of claim 7 including the steps of
    juxtapositioning the apparatus after the closing step to a boat onto which such captured fish is to be stored,
    setting in the water sack means around the apparatus, opening the closed bottom of the net assembly, and transferring the captured fish into the sack means.

14. The method of claim 13 wherein said transferring step comprises
    lifting the apparatus out of the water.

15. The method of claim 1 or claim 2 or claim 3 or claim 6 including maintaining the net assembly in a non-collapsed condition during its operation.

16. The method of claim 4 including maintaining the net assembly in a non-collapsed condition during its operation.

17. The method of claim 5 including maintaining the net assembly in a non-collapsed condition during its operation.

18. The method of claim 7 including maintaining the net assembly in a non-collapsed condition during its operation.

19. The method of claim 8 including maintaining the net assembly in a non-collapsed condition during its operation.

20. The method of claim 9 including maintaining the net assembly in a non-collapsed condition during its operation.

21. The method of claim 10 including maintaining the net assembly in a non-collapsed condition during its operation.

22. The method of claim 11 including maintaining the net assembly in a non-collapsed condition during its operation.

23. The method of claim 12 including maintaining the net assembly in a non-collapsed condition during its operation.

24. The method of claim 13 including maintaining the net assembly in a non-collapsed condition during its operation.

25. The method of claim 14 including maintaining the net assembly in a non-collapsed condition during its operation.

26. A fishing apparatus comprising
    a first rigid hoop and a second rigid hoop,
    an endless net having an upper end and a lower end, said second hoop mounted to said net at its upper end, said first hoop mounted to said net between said upper end and lower end so that in operation of said apparatus said first hoop and second hoop are fixedly spaced from one another,
    skirt means mounted to said first hoop and having a closeable edge,
    means mounted to said second hoop for supporting said apparatus draw line means extending around said edge and having ends,
    closure means attached to one of said ends of said draw line means, and means for actuating said closure means into movement to thereby cause said draw line means to close the edge of said skirt means.

27. The apparatus of claim 26 wherein
said skirt means is foldable and unfoldable exteriorly of said net, and
means for folding and unfolding said skirt means in the open mode for the apparatus prior to actuating said closure means.

28. The apparatus of claim 26 including a cable,
said supporting means and actuating means connected to said cable.

29. The apparatus of claim 26 including
a cable,
said supporting means, said actuating means, and said means for folding and unfolding connected to said cable.

30. The apparatus of claim 28 or claim 29 wherein
said supporting means comprises a plurality of lines spacedly mounted about and to said second hoop.

31. The apparatus of claim 28 or claim 29 wherein
said actuating means comprises a line connecting said closure means to said cable, and
a first means mounted on said second hoop guiding said line from said closure means to said cable.

32. The apparatus of claim 29 wherein
said folding and unfolding means comprises
a plurality of lines connecting the skirt's edge to said cable, and
a second means mounted on said second hoop for guiding each of said lines from said edge to said cable.

33. The apparatus of claim 32 wherein
said supporting means comprises a plurality of lines spacedly mounted about and to said second hoop.

34. The apparatus of claim 32 wherein
said actuating means comprises a line connecting said closure means to said cable, and
a first means mounted on said second hoop guiding said line from said closure means to said cable.

35. The apparatus of claim 34 wherein
said supporting means comprises a plurality of lines spacedly mounted about and to said second hoop.

36. The apparatus of claim 32 or claim 33 or claim 34 including
a buoy mounted on at least one of said plurality of lines connecting the skirt's edge to said cable,
said buoy when floating on the water's surface indicating that the skirt is unfolded.

37. The apparatus of claim 26 or claim 27 or claim 28 or claim 29 or claim 32 or claim 33 or claim 34 or claim 35 including
quick-disconnect means mounted to said first hoop and operatively connected to said draw line means distally from the latter's connection to said closure means for generating slack in said draw line means to thereby open said skirt means.

38. The apparatus of claim 37 wherein said quick-disconnect means comprises
a quick-disconnect unit secured to said first hoop and
a line having a buoy thereon and being operatively connected to said quick-disconnect unit.

39. The apparatus of claim 37 including
wave net means mounted to said second hoop for preventing fish from escaping through the top of said apparatus.

40. The apparatus of claim 39 wherein said wave net means comprises an endless ribbon of netting and a plurality of corks mounted on said netting.

41. The apparatus of claim 26 or claim 27 or claim 28 or claim 29 or claim 32 or claim 33 or claim 34 or claim 35 including means for floating said apparatus.

42. The apparatus of claim 41 wherein said floating means comprises a plurality of corks spacedly mounted about and on said second hoop.

* * * * *

UNITED STATES PATENT AND TRADEMARK OFFICE
CERTIFICATE OF CORRECTION

PATENT NO.   :   4,986,021
DATED        :   Jan. 22, 1991
INVENTOR(S)  :   Kent R. Thomas It is certified that error appears in the above-identified patent and that said Letters Patent is hereby corrected as shown below:

In the drawings, delete sheets of drawings consisting of FIGS. 5 - 10, and substitute therefore FIGS. 5 - 10, as shown on the attached sheet.

In column 10, line 65, a comma ( --,-- ) should be read after "apparatus".

Signed and Sealed this

Sixteenth Day of February, 1993

Attest:

STEPHEN G. KUNIN

Attesting Officer

Acting Commissioner of Patents and Trademarks